Patented Apr. 11, 1950

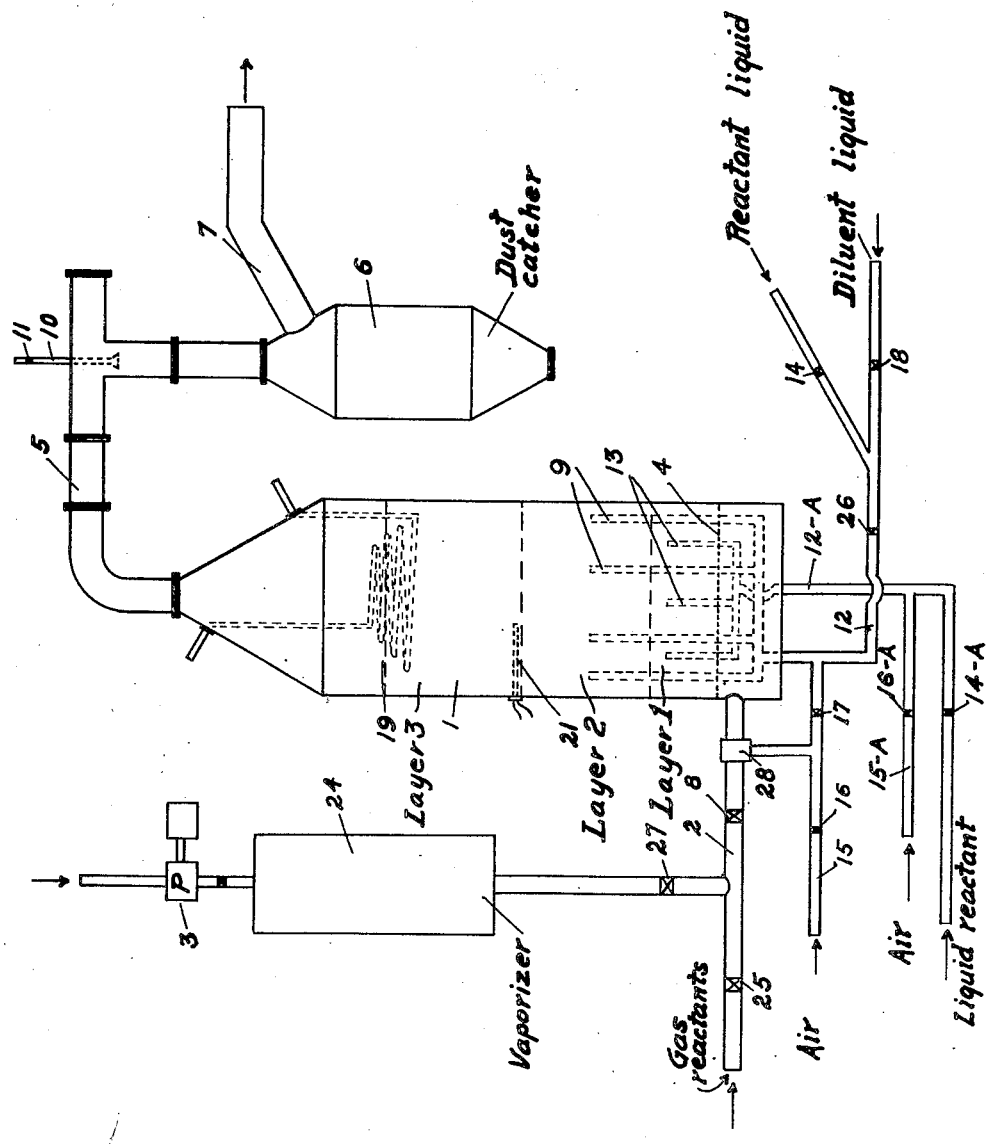

2,503,291

UNITED STATES PATENT OFFICE 2,503,291

PROCESS OF PROMOTING REACTIONS IN A FLUIDIZED BED COMPRISING A PLURALITY OF CATALYSTS

William W. Odell, Washington, D. C.

Application March 14, 1945, Serial No. 582,692

31 Claims. (Cl. 260—449.6)

This invention relates to a process of treating materials and promoting chemical reactions; reactions which may be exothermic or endothermic in nature and includes the cracking of hydrocarbons. In particular it has to do with that class of reactions which are promoted during the passage of an aeriform fluid upwardly as a stream through a confined bed of small size solids at such a velocity that said solids assume a fluidized condition, that is, they remain suspended in the stream in the confining vessel and do not, to any appreciable extent, pass out of said vessel entrained in the aeriform fluid. More specifically it refers to means and method of controlling reactions in the aeriform stream contacting the fluidized solids in a reaction chamber while chemical reactions are occurring therein, and to means and method of fluidizing the contact solids in a reaction chamber.

One of the objects of this invention is to decrease the amount of initially gaseous or vaporous fluid required to maintain finely divided solids in a given state of fluidity in a reaction chamber, below that required in common practice.

Another object is to make possible the treatment of materials which are normally liquid or solid without first causing them to be completely vaporized; it is cheaper to pump liquids than gases.

Another object is to attain better control over the temperature of the fluidized solids and fluidizing stream in the reaction chamber and to admit reactants and/or non-reactant liquids directly to the fluidized, confined mass of solids while promoting chemical reactions in the reaction chamber. Other objects will become evident from the disclosures made herein.

In ordinary practice, so far as I am aware, chemical reactions of the type included herein, are promoted by passing the stream of reactant material or materials at a chosen temperature, in the vapor or gas phase, upwardly through a confined bed of solids which are finely divided and which may be catalyst to the reactions, at a velocity at least sufficient to maintain the solids in a state of ebullient motion commonly called a fluidized state. If the reactions are strongly exothermic, the solids are removed and recirculated continuously both for the purpose of temperature control and the revivification of the activity of said solids. This procedure is costly. Furthermore, the fluid (gas or vapor) cannot be circulated at a lower velocity than the stated minimum required for fluidizing in order to obtain the desired effect in spite of the fact that in some cases a longer or shorter time or intimacy of contact of reactant fluid with the solids is desired and at a lower or higher temperature.

I find that it is not necessary to recirculate the fluidized solids in order to control temperature and furthermore it is not necessary to pass reactant aeriform fluid into the mass of contact solids at the rate required to fluidize them. It is also found that benefits derived from dilution of reactant fluid or fluids can be obtained with simultaneous cooling of the fluid stream which is a new practice and permits new effects and results to be obtained.

Before describing the process by specific examples, it is desirable, for the purpose of clearness, to enumerate some of the many reactions which may be advantageously promoted employing this invention, as follows:

(1) Oxidation of hydrocarbon compounds forming such useful products as aldehydes, alcohols, ketones and acids. Methane, for example, yields formaldehyde, methanol, formic acid and other products; benzene yields maleic anhydride, phenol and other products; naphthalene yields phthalic anhydride, naphthols, and other products; propane yields acetic acid, propionic acid, acetaldehyde, ethyl alcohol and other products; ethylene yields ethylene oxide a product readily convertible to a glycol; and treatment of materials with other oxidizing agents including chlorine with or without a catalyst yield other useful oxidation products.

(2) Polymerization of unsaturated hydrocarbon compounds, commonly accentuated by the presence of certain catalysts and acidic materials and by elevated temperatures.

(3) Cracking of hydrocarbon compounds in the presence of fluidized solids as contact material which material may be catalytic to the reactions.

(4) Reduction of such materials as nitro-organic compounds in the vapor phase in the presence of reducing gases such as hydrogen at elevated temperatures in a fluid stream while passing the fluid stream containing the hydrogen and nitro compound into contact with a fluidized catalyst such as nickel, tin, or copper, for example. Amino compounds may be prepared in this manner.

(5) Synthesis of organic compounds such as the production of hydrocarbons and oxygenated hydrocarbons from reaction of hydrogen with carbon monoxide at temperatures of the order of 200° C. in the presence of a catalyst adapted to promote chosen particular reactions.

The figure shows diagrammatically as a flow sheet, one form of apparatus in which this invention may be practiced.

In the figure, the reaction chamber 1 confines a deep bed of finely divided catalyst or other solids adapted for use as contact material in promoting chemical reactions; pump 3 is adapted to pump liquid reactant material to and through the vaporizer 24, and to force the vapors through valve 27, conduit 2, valve 8 and mixing box 28 into reaction chamber 1, under controlled pressure. Conduit 5 conducts the stream containing reaction products to dust separator 6 from which the stream discharges through offtake 7. A porous member 4 helps to distribute vapor phase fluid supplied at the base of the reaction chamber. Means for quickly quenching or cooling the stream of reaction products passing out through 5 are shown by conduit 10 and valve 11 for supplying a cooling fluid such as water under control whereby the gaseous stream is cooled by the vaporization of the latter fluid which fluid may be water. Reactant volatilizable liquid is supplied to chamber 1 through valve 14 and diluent volatilizable liquid is supplied through valve 18, both passing through valve 26 and conduit 12 to the reaction chamber. Conduit 15 with control valve 16 allows primary air, oxygen or other combustion supporting aeriform fluid to pass into chamber 1 under control. Valve 17 is a by-pass allowing the oxidizing fluid to flow through conduit 12 into chamber 1 through risers 9. The conduit 15—A for oxidizing fluid has control valve 16—A whereby the latter fluid flows under control through conduit 12—A and through risers 13 into chamber 1 directly into the bed of contact solids. Liquid reactant material may flow through valve 14—A and 12—A and 13 into said bed. Valve 25 controls the supply of gaseous reactants which may flow through 2 and valve 8 into chamber 1 beneath the porous member 4. Valve 27 controls the supply of vapors from 24 although this can be accomplished by controlling pumping rate of pump 3. Thermocouple 21 is suitably connected for measuring the temperature in the fluidized mass in the reaction chamber and cooling coil 19 is suitably connected with a source of supply of a cooling liquid whereby the fluid stream in the upper portion of chamber 1 can be cooled to a predetermined amount just as or just before it leaves contact with the fluidized solids. This cooling member is preferably located below the top of the fluidized solids in chamber 1 for most reactions; the quantity of solids used determines the relative location in chamber 1.

An example of the operation of this invention with reference to the oxidation of an initially liquid hydrocarbon material with air is as follows:

*Example 1.—Oxidation of petroleum naphtha*

Referring to the figure, naphtha having a distillation end point of about 400° F. is pumped into vaporizer 24 at a controlled rate from whence it passes as a vapor through 27 into conduit 2 and through valve 8 into chamber 1 under super-atmospheric pressure, at a velocity sufficient to cause the particles or pieces of catalyst, confined therein in a deep bed, to become fluidized, that is, to become so suspended in the stream substantially in ebullient motion that they remain confined in said chamber while the stream passes on through the chamber and out through 5, 6 and 7. The catalyst may be molybdenum oxide, vanadium oxide, copper oxide, silver oxide or other catalyst known to function as an oxidation catalyst. Preferably the catalyst is first heated to a temperature of about 665° to 755° F. which may be done by burning naphtha vapors in said chamber substantially in contact with said catalyst. When the catalyst is hot and the naphtha vapors are passing through the chamber, upwardly at the stated fluidizing velocity air or oxidizing fluid is cautiously admitted to chamber 1 by opening valve 16 in air conduit 15. The temperature in the fluidized mass of catalyst in chamber 1 will now increase and, in order to offset this condition, the following steps, which are believed to be new in the art, are taken: Valve 14 is opened to allow liquid naphtha to pass through 12 into the fluidized catalyst in 1 and valve 8 or the equivalent is partly closed. The liquid naptha vaporizes and increases in volume about 380 times its liquid volume and thus supplies not only reactant material to the chamber but it is in this case in part the propellant which maintains the catalyst in a fluidized condition and a temperature control medium since before it reacts chemically it absorbs heat through vaporization and in being heated to reaction temperature; secondary air is admitted through 15—A and valve 16—A. The operation is now self-sustaining and it is merely necessary to adjust the relative amounts of air and liquid naphtha used so that the temperature of the fluid stream adjacent the catalyst is not appreciably above 400° C. and usually preferably below 400° C. Increasing the amount of oxygen flowing into chamber 1, other things remaining the same, raises the temperature in the fluidized mass and, after an optimum point, is passed, it causes excessive formation of water and oxides of carbon as products of combustion. The optimum point is approximately reached when the temperature of the fluid stream in chamber 1 approaches 400° C. It is possible to oxidize the naphtha in this manner so that more than 50 percent of it is accounted for in the liquid oxidation products which are readily condensed from the stream of reaction products discharged from chamber 1, exclusive of the water formed. The organic oxidation products are chiefly alcohols and aldehydes with some esters and fatty acids. The maximum yield of aldehydes is obtained in the higher temperatures in the approximate range 350° to 400° C. whereas the maximum yield of alcohols is obtained operating in the lower portion of this range. Other factors which affect results are: the nature, kind and physical characteristics of the catalyst, size of catalyst particles, depth of catalyst bed, the nature of the naphtha used and the amount of volatilizable diluent used with the naphtha. The foregoing variables all affect the intimacy and duration of contact of the reactant material (naphtha) with the catalyst surface and in the aggregate have a pronounced effect on results. Certain oleates, those of manganese and copper as well as certain metal naphthenates when dissolved in the liquid naphtha and supplied to the reaction chamber through valve 14 and conduit 12 have a pronounced effect in increasing the amount of acids and alcohols produced. Other catalysts including gaseous catalysts may be used in promoting particular effects. This step of introducing a special catalyst in solution or suspension in a volatilizable liquid reactant or in a liquid which is not necessarily a reactant into the mass of fluidized solids during process operation is believed to be a new step in the art. Variations to suit particular requirements as to the end products can be made by adjusting the different variable or combinations of them. The stream of reaction products are refined and when desired fractions not oxidized or even some that are oxidized are recycled, that is, returned to the reaction chamber for further processing. Summarily, it may be said that the temperature to be employed for any particular naphtha should be selected after trial over a range of temperatures; the oxygen or air supplied should be less than enough for the complete combustion of the reactant hydrocarbon material used (naphtha in this example), the catalyst should ordinarily be finely divided, usually less than 1/8 of an inch in diameter, the depth of the mass of catalyst should be chosen to suit conditions and usually in the range 2 feet to 20 feet. Inert material or rather less reactive material than naphtha may be used in admixture with naphtha by opening valve 18, for either dilution effect, temperature control, or for both purposes or for other purposes such as control of time and intimacy of contact of the reactant material with the catalyst. This inert or diluent material may be a stable volatilizable organic compound such as benzol or toluol or other substance. The named diluents are oxidizable but less readily than naphtha at the specified temperatures; benzol is the most stable and is satisfactory for the purpose, the unreacted benzol being recovered from the reaction products and used again in the process. Because of its high boiling point and other properties diphenyl may be used as a diluent liquid. It is recognized that with vanadium pentoxide catalyst and a very appreciable relative amount of air, benzene will oxidize to maleic acid anhydrate but, because of the manner in which the diluent benzol is introduced into chamber 1, and the oxygen concentration and the temperature limitations very little benzol will react during the oxidation of naphtha as described.

*Example 2.—Oxidation of toluene*

Toluene oxidizes to form, among other products, benzoic acid, benzaldehyde, benzyl alcohol at temperatures below that which is required to break or oxidize the benzene-ring constituents.

Using vanadium pentoxide catalyst and operating the process in such a manner that the oxidation reactions are conducted in reaction chamber 1 at approximately 400° to 460° C. about 60 percent of the toluene oxidized is in the form of benzoic acid, but appreciable amounts of quinones are also formed. The air initially mixed with the toluene is preferably about 10 to 20 percent by volume of the vapor phase toluene, which corresponds with saturation of air with toluene at about 45° C. to 65° C. This air is admitted through 15 and valve 16 of the figure and the toluene vapor is introduced through 2, 27, 8 and 28. The mixture of air and toluene should be at about 45° C. to 65° C. as it passes into the catalyst mass through porous member 4. After the mass of catalyst is fluidized secondary air or oxygen is supplied through 15—A and 16—A. The temperature will rise and after it has reached 460° C. less of the toluene vapor and primary air are introduced through 8 and 16 respectively and the secondary air or oxygen is supplied by opening, under control, valve 16—A whereas the liquid toluene is supplied by similarly opening valves 14 and 26. It is necessary to keep the volume of total fluids supplied sufficient to maintain the catalyst in a fluidized condition and it is necessary to make sure that the total air supplied is less than sufficient for the complete combustion of the toluene used. The theoretical requirements for the oxidation of toluene to benzoic acid and benzaldehyde are approximately 7.2 volumes of air to 1 volume of toluene vapor for the former and 4.8 volumes of air to 1 volume of toluene for the latter. Thus the amount of air, oxygen, or both added initially with the toluene vapor at the base of chamber 1 is only a portion of the theoretical amounts. Additional oxygen is supplied preferably as air in zones above the porous member 4, as through 12—A. Sufficient diluent such as diphenyl or excess toluene or both are employed, as through valve 18, so that excessive temperatures do not exist in the fluidized mass in chamber 1. Less than 1 second contact time for the reactant stream with the catalyst is required. The exact optimum temperature, contact time and air-toluene ratio can readily be determined for a particular catalyst by experiment in view of the foregoing. With molybdenum oxide as catalyst either a little more time or a temperature above about 460° C. in the fluidized mass is desired.

Phthalic anhydride can be made in like manner from naphthalene or methyl naphthalene by controlled oxidation. The optimum temperature for promoting this reaction is markedly dependent on the catalyst employed, other factors remaining the same, hence it may be said that about 300° to 500° C. is a suitable range, bearing in mind that with active catalysts of the type including vanadium-oxygen compounds and a rather deep bed of catalyst the optimum temperature is not far above or below 300° C. whereas with less active catalysts or a shallow bed of catalyst higher temperatures are desired.

It is well known that carbon monoxide and hydrogen react with one another catalytically at a temperature as low as 200° C. yielding hydrocarbons. When this is accomplished under pressure of 10 to 20 atmospheres considerable wax and high-boiling hydrocarbons form, but when the reaction is promoted at lower pressures and the velocity of flow of the stream of mixed CO and $H_2$ is such as is normally required with the fluidized catalyst, the reactions occurring yield lower-boiling hydrocarbons such as methane, ethane, propane, ethylene and propylene. In other words, water gas can be enriched to standards suitable for city gas by passing the mixed CO and $H_2$ through the selected catalyst and maintaining said catalyst at a temperature above 180° C., and below about 250° C. These reactions are strongly exothermic and it is necessary to circulate sufficient non-reactant volatilizable liquid in the process, along with any other cooling, to prevent excessive temperature rise. Referring to the figure, the CO and $H_2$ mixture is supplied to the reaction chamber 1 through valve 25, conduit 2, valve 8 and box 28. No secondary or primary air is used but liquid, which is preferably not reactive at the stated temperatures is introduced into 1 by opening valves 18 and 26 sufficiently to bring about the desired result. The effluent gaseous stream is cooled, condensate removed therefrom and the enriched gas is recovered.

It will be understood that in general when operation is in progress, all of the fluidizing materials may be added in the liquid state and valve 8 may be closed; however, when one of the reactants is a gas such as oxygen, chlorine, ethylene, carbon monoxide, hydrogen or the like, it can be supplied to chamber 1 of the figure either in part through 2 and valve 8, in part through 15, 16 and 17 or entirely through the valves and conduits shown in the figure which supply reactants above the porous member 4.

*Example 3.—Production of carbon black*

The procedure is basically the same in this case but the end product being a solid is removed by separators and electric precipitators of known design instead of by condensation and fractionation. For the effective production of a high grade carbon and/or high yields from a given hydrocarbon it is desirable that the hydrocarbon used as raw material be introduced into the hot combustion products, which products may still have associated with them some burning fuel gas, while the fluidized solids are incandescent, and the duration of contact with the hot solids should be very brief. Referring to the figure, one procedure is as follows: Burn gaseous fuel admitted through 25, 2, valve 8 and box 28 with air or oxygen or both admitted through 15, 16 and 28, at substantially the base of chamber 1, continuously passing the stream containing combustion products upwardly through a mass of fine size solids, for example silica, silicon, and, for certain types of carbon, iron, nickel or the like may be used. The solids are maintained fluidized and the reactant raw material in this example is preferably gaseous or vaporous hydrocarbon which is admitted through 14, 26 and 12, preferably mixed with some air or oxygen. Only enough total air or oxygen is used to maintain the chosen temperature in the reacting stream in the mass of fluidized solids; a final boost to the desired temperature, offsetting at least some of the endothermic reaction which is typified by Equation I, is obtained I $\qquad CH_4 + heat = C + 2H_2$ when required and as desired by opening valve 17, or 16-A or both. A very deep bed of contact solids is not desirable in promoting this type of reactions. A waste heat boiler may be used to cool and recover sensible heat from the stream of reaction products by inserting it ahead of the dust catcher, namely between reaction chamber 1 and said dust catcher, it being necessary that velocities of flow of said stream therethrough be sufficiently high to prevent excessive deposit of carbon therein. Here the dust catcher may be a carbon catcher. Although the figure shows valve 14 as a control of a supply of liquid reactant, it may be used as in this case to control the supply of gas reactant. When the operation is under way a supply of diluent may be introduced at will to obtain the particular kind of carbon sought, or the diluent may be gaseous such as $N_2$, $CO_2$, $H_2O$ vapor or combinations of them or other gaseous material. The highest yield of carbon is produced when the temperature is at or above about 1800° F. The quality is good at 1700° F. and above and the particle size is apparently a function of dilution and duration of contact of the stream with the fluidized solids. Maximum yields far greater than in other processes with which I am familiar are attainable; substantially complete cracking is attainable with complete recovery of carbon black.

It is believed that the manipulations and steps in the process have been sufficiently described so that one skilled in the art can practice it with the many variations possible and obtain results which differ in degree and extent from those given in the examples. It is of course obvious that the diluent liquid may be introduced at different levels, the figure merely shows its applicability. It is perhaps obvious that a diluent liquid may be entirely non-reactive or on the other hand it may be so selected that it will react with the major reactant or with one of the products resulting from processing it. Again, the oxidizing agent may be, for example, oxygen, or chlorine, instead of an oxygen bearing fluid such as air, and a gaseous catalyst such as boron trifluoride, may be used when desired. It is believed that these variations are within the scope of this invention and that further specific instructions as to operating procedure are not necessary. The possible control over the oxidation of aldehydes to acids will become evident from a careful study of this specification. New effects are obtainable by the practice of this invention which are not obtainable so far as I am aware in other procedures. These effects are believed to be due in part to the control over operating variables including temperature and intimacy of contact and time of contact with the catalyst. It is understood that the solids confined in chamber 1 of the figure, and which are fluidized in the operation of the phase of the invention outlined above, are substantially uniformly sized; with a large variation in size the larger size pieces or particles tend to sink to the bottom of chamber 1 adjacent member 4, and the very fine sizes tend to leave the chamber entrained in the fluid stream.

The inventor claims that the steps outlined above not only afford a single apparatus in which a multiplicity of useful products can be prepared, shifting from one to the other with minimum effort, but they permit economies to be made over other processes with which he is familiar, in the production of such materials as, alcohols, aldehydes, acids, ethylene oxide and other oxides, carbon black, unsaturated hydrocarbons from saturated hydrocarbons and in the production of other reaction products. Ethylene mixed in appreciable excess with oxygen oxidizes at temperatures below about 450° C. and above 300° C. to form ethylene oxide and formaldehyde, whereas at temperatures above 400° to 450° C. polymerization occurs and this effect is promoted by using a polymerization catalyst and only sufficient oxygen or air to maintain the temperature.

In making carbon by thermally decomposing such hydrocarbons as methane, ethane, ethylene and the like, it will be found that excessive temperatures and maintenance of the carbon at a high temperature for an appreciable time tends to produce a hard carbon which is not so readily dispersable as one made at lower temperatures such as 1600° to 1800° F. in a stream containing diluent gas or vapor and which stream is cooled soon after the carbon is formed.

Thus far only one phase of this invention has been described, namely that in which the solids fluidized in reaction chamber 1 are substantially uniformly sized, of small size and substantially of the same composition. Another phase of this invention includes the use of a plurality of different catalysts in chamber 1, but so selected and graded that they remain largely in separate layers although each layer being part of a common fluidized mass. This is believed to be strictly new in the art. It cannot be accomplished by merely mixing together any two different catalysts. In particular it is usually advantageous to use a specific catalyst in the lower layer and a particular different catalyst in an upper layer. For example, an iron oxide or an iron-aluminum oxide catalyst may be used as a lower layer catalyst with or without silicon incorporated therewith and a catalyst of lower specific gravity such as aluminum phosphate, sodium aluminum fluoride may be used in the upper layer. When the particles are the same size in each layer the lower the gravity particles will remain confined in the upper layer and only a relatively thin layer will be mixed with those of the lower layer at an intermediate level. The unsaturated hydrocarbons formed by cracking or by cracking in conjunction with partial oxidation in the lower layer as described will polymerize in the presence of aluminum phosphate and/or certain acid salts or acidic reacting salts. In order to carry out this phase of the invention, which is considered a most important phase, one of two conditions must prevail, namely, when the catalyst particles are all the same density a double layer can be maintained only when the particles in the lower layer are larger than those in the upper layer, whereas when the particles of one catalyst are appreciably denser than those of the other the particles in both the upper layer and bottom layer may be the same size and should be substantially uniformly sized. In other words, by adjusting the relative size of the particles and selecting catalysts of predetermined relative densities any number of different layers may be maintained in a common fluidized mass. I find, however, that if the particles in a top layer have a much lower density or specific gravity than those of the bottom there is a greater tendency for the top particles to be carried out of the reactor entrained in the fluid stream; this result can be prevented by making the upper portion of the reaction chamber wider than that adjacent the bottom layer of catalyst.

In the oxidation of hydrocarbons with air or a gas containing or comprising free oxygen, it is known that aldehydes, alcohols and ketones may be formed but the preservation of such compounds in the amount formed is not easy and commonly further reaction occurs with the destruction of said compounds before they are removed and cooled. Other unstable compounds which have only fleeting existence are formed, such as CH3, SH2, C2H2 and other active radicals and unsaturated compounds which can most readily be reacted further when freshly generated. Accordingly, one of the objects of this invention is to provide a catalyst bed or fluidized mass of solid catalyst continuous with the lower oxidizing catalyst bed whereby further reaction of a chosen type may be immediately promoted. For example, a catalyst adapted to promote the formation of formaldehyde from ethane may be employed in the bottom or lower layer and the stream of ethane with a proper amount of oxidizing agent is passed upwardly through the said lower layer at a velocity sufficient at least to fluidize the solids in said layer while they are sufficiently hot for formaldehyde to form. The stream containing the reaction products including formaldehyde passing upwardly through the plurality of different layers of fluidized hot solids, contacts the solids in a layer above the bottom layer substantially as fast as the primary reaction products, such as formaldehyde, are formed. The primary products, or at least one of them, is caused to enter further reaction by virtue of contact with the fluidized solids in said upper layer. The lower layer may, in this instance, comprise a base material with copper, silver, or both, let down thereon, or it may include a base material with vanadium pentoxide, or it may comprise other catalyst known to catalize the production of formaldehyde. An upper layer, in this example may comprise aluminum oxide catalyst, phosphorous pentoxide, aluminum phosphate, combinations of them with a carrier or without a carrier, or other catalyst known to catalize polymerization. The formaldehyde is polymerized to paraldehyde or other polymer which subsequently may be removed from the stream by known methods. At pressures approximating atmospheric formaldehyde is readily polymerized at a moderate temperature. It may be desirable to note that formaldehyde, a gas, behaves differently than might be expected in that low temperature and low pressure favor polymerization, whereas high pressure with high temperature favor depolymerization. Similarly, ethylene entering into reaction with oxygen to form ethylene oxide is further reacted by catalytic isomerization to form acetaldehyde.

Thus, in the last described phase of the invention double reactions can be carried out in one fluidized mass of catalytic solids, such as:

Cracking followed by polymerization.
Cracking followed by oxidation.
Oxidation followed by polymerization.
Alkylation followed by polymerization.
Dehydrogenation followed by hydration or oxidation.
Isomerization followed by polymerization.

It is belived that other possible variations in operation in carrying out this invention can readily be seen and carried out by one skilled in the art.

Having described my invention so that one skilled in the art can practice it, I claim:

1. A process for promoting chemical reactions in a reaction chamber, comprising, passing an aeriform fluid upwardly through a fluidized stratified mass of subdivided small-size solids confined in said chamber substantially from beneath said mass while said solids are at a temperature suitable for promoting chemical reactions, said mass of solids comprising particles having different physical and catalytic characteristics, introducing a volatilizable liquid into one of the layers of said stratified mass above the bottom thereof, causing said liquid to substantially completely vaporize in said mass the vapors forming with said aeriform fluid a combined stream having sufficient velocity to maintain said solids in a fluidized condition in said chamber, promoting chemical reaction in said stream while passing through said chamber in contact with said solids, at least one of the components of said combined stream entering said reaction, and discharging the stream containing at least one valuable reaction product and recovering it, said fluidized mass of solids comprising a plurality of different layers the particles of one layer comprising largely different catalyst from those of an adjacent layer.

2. In the process of promoting chemical reactions by passing a fluid stream initially containing a reactant in the vapor phase upwardly through a mass of fluidized fine-size solids which mass includes a plurality of catalyst-solids and which is confined in a reaction chamber in a plurality of layers at such rate that the said solids are maintained fluidized therein substantially as a stratified bed while they are at a temperature suitable for promoting chemical reaction of said reactant, the step of forming a portion of said stream by vaporizing a readily volatilizable liquid in said chamber in contact with said solids in one of a plurality of different layers of which said mass is comprised, above the bottom layer.

3. In the process of promoting chemical reactions by passing an aeriform fluid stream containing a reactant material in the vapor phase upwardly through a stratified fluidized bed of small size solids which bed includes a plurality of different kinds of solids and which is confined in a reaction chamber in a plurality of layers at an elevated temperature and reacting it in said bed, the steps, comprising vaporizing substantially continuously a volatile liquid initially containing a reactant and a catalyst for chemical reaction within said confined mass in a portion thereof adjacent the bottom at such a rate that the vapors formed are at least an appreciable part of said fluid stream which stream is the motivating force which fluidizes said solids, thereby catalyzing the promoted chemical reaction, and introducing into said bed at a higher level a volatilizable coolant liquid and vaporizing it in said stream.

4. The process of promoting chemical reactions by passing reactant materials into contact with a plurality of different catalytic solids in a fine state of subdivision, comprising, passing a fluid stream initially containing a plurality of reactants adapted to react with one another upwardly through a deep bed of finely divided solids, which bed comprises two different catalysts having different catalytic and buoyancy properties, at such a velocity that said solids are fluidized in said bed in a plurality of strata, the most buoyant catalyst solids being disposed in the top stratum and the least buoyant solids being disposed largely in a lower stratum of said bed, while said finely divided solids are at an elevated temperature favorable for promoting chemical reaction of said reactants thereby causing said reactions to occur, and removing reaction products in said stream substantially from above said layers.

5. The process of promoting catalytic chemical reactions, comprising, fluidizing a mass of a plurality of different finely divided solid catalysts confined in a reaction chamber by passing a fluidizing stream upwardly therethrough, said catalysts being so selected and graded that they form different stratified layers in said mass thus fluidized, one layer being comprised chiefly of one catalyst and another layer being comprised largely of a different catalyst, passing reactant material upwardly into said fluidized mass in said stream while the said catalysts are at a temperature favorable to promote said chemical reactions, causing said reactant material to react chemically in a lower catalyst layer and causing at least one of the reaction products therefrom to immediately enter further chemical reaction by virtue of a different catalyst in an upper layer of said mass, removing the final reaction products in said stream.

6. In the process described in claim 5 the step of introducing at least one reactant into the said stream at a location part way along its path of travel through said fluidized mass.

7. In the process described in claim 5 the step of introducing a catalyst from without said mass along with reactant material into a layer of said mass between the top and bottom thereof.

8. In the process described in claim 5, the step of regulating the temperature in that portion of the said fluidized mass above the bottom portion thereof by introducing into said stream in a catalyst layer above the bottom layer a controlled amount of a coolant fluid.

9. In the process described in claim 5, the step of introducing said reactant material into said fluidized mass in a plurality of different layers.

10. In the process of promoting chemical reactions in a fluidized mass of catalytic, small-size solids confined in a reaction chamber, by passing a fluid stream, initially containing at least one reactant adapted to react catalytically, upwardly through a plurality of layers of different catalysts which layers are each a part of said fluidized mass, while said solids are at a temperature favorable for promoting said reactions, the steps comprising, so selecting and grading said different catalysts that they remain substantially as separate stratified layers in said fluidized mass, and maintaining said favorable temperature in said mass at least partly by introducing a temperature controlling fluid into said stream in said mass at a level between the top and bottom of said mass.

11. In the process of promoting chemical reactions, by passing a fluid stream initially containing reactant material upwardly through a fluidized bed of small-size catalyst solids confined in a reaction chamber, the steps comprising, so grading a plurality of different catalysts into sizes relative to their respective densities that a plurality of different stratified layers form in said bed when they are fluidized in said chamber, different catalyst being disposed largely in the different layers, introducing a stream containing at least one reactant material substantially from beneath said bed and introducing into said stream in an upper layer of said bed another stream containing reactant material and causing chemical reactions to occur in the stream passing through said upper layer.

12. The process of promoting catalytic chemical reactions by passing a fluid stream initially containing reactant material upwardly through a bed of fluidized catalyst solids confined in a reaction chamber, comprising, introducing a reactant fluid into said bed at substantially the bottom thereof, introducing reactant substance adapted to react chemically with the first named reactant fluid, as a fluid at a higher level of said bed, introducing reactive material as a fluid into said bed at a still higher level, causing catalytic reactions to occur in the lower and intermediate portion of said bed, causing different catalytic reactions to occur in said bed at a higher level, removing the products of reaction as a common stream from above said bed, and regulating the temperature in said bed by introducing a controlled amount of a cooling fluid into it in such a manner that it combines with and is discharged with said common stream, said solids being so selected as to catalytic activity and so graded as to relative specific gravity and size that they form in said bed a plurality of stratified layers, different catalyst in different layers.

13. A process for promoting chemical reactions in a reaction chamber by contacting a fluid stream containing reactant material with a plurality of finely divided solid catalysts having different buoyancy properties, comprising, passing a fluid stream initially containing at least one reactant material upwardly through a mass of the finely divided solids while they are confined in said chamber at an elevated temperature suitable for promoting said reactions, at such a velocity that said mass of solids is fluidized forming a plurality of strata in the fluidized mass, the solids in one stratum being largely of different physical and catalytic properties than those in an adjacent stratum, and causing said reactant to react chemically in said stream while passing through said fluidized mass.

14. The continuous process of promoting chemical reactions by contacting reactant materials with finely divided solids, comprising, fluidizing, while confined in a reaction chamber at reaction temperature, a mass of finely divided solids which solids comprise particles having different physical characteristics with respect to buoyancy in an upwardly moving gaseous stream, by passing a fluid stream initially containing reactant material upwardly through said mass at a velocity whereby said solids are fluidized in a plurality of different strata in a common bed in such manner that the least buoyant solids are disposed largely in the bottom layer of said bed and the most buoyant solids are disposed in an upper layer of said bed, reacting said material in said fluid stream in said reactor in contact with the solids in a layer of said bed adjacent the bottom thereof, and causing the reaction products to enter further reaction in said stream in contact with the solids in an upper layer of said bed by introducing into said stream in the latter layer a different reactant, one capable of reacting with at least one of said reaction products, and removing the resulting reaction products overhead.

15. The continuous process of promoting chemical reactions by contacting reactant materials serially with a plurality of different finely divided solid catalysts which different catalysts have different physical, catalytic and buoyancy properties, comprising, reacting a plurality of reactant materials initially present in a gasiform fluid stream by passing said stream upwardly through an appreciably deep bed of said plurality of different finely divided solid catalysts at such a velocity that the finely divided solids are fluidized in said bed in a plurality of strata, the catalyst of least buoyancy in said stream being disposed in a lower stratum of said bed and the particles of a different one of said catalysts having greatest buoyancy being disposed largely in the uppermost stratum of said bed, maintaining the temperature in the different strata favorable for the said materials to react chemically thereby causing them to react catalytically as said stream passes upwardly serially through the different strata, and discharging the stream containing reaction products substantially from above said bed.

16. The process defined in claim 15 in which the said plurality of reactants include CO and $H_2$.

17. The process defined in claim 15 in which the said plurality of reactants include CO and $H_2$ and in which at least one of the catalysts is catalytic to the formation of hydrocarbon compounds.

18. The process defined in claim 15 in which the said plurality of reactants includes a combustion-supporting gas.

19. The process defined in claim 15 in which said plurality of reactants includes a combustion-supporting gas and in which a volatilizable liquid is introduced into said stream, in a stratum of said bed above the bottom thereof, and volatilized therein.

20. The process defined in claim 15 in which the said plurality of reactants includes CO and $H_2$ and in which the said fluid stream initially containing said reactant materials is introduced into said bed in a plurality of said different strata.

21. The process defined in claim 15 in which exothermic reactions are promoted accompanied by the evolution of considerable heat and in which the stream containing reaction products is contacted with a cooling surface in a stratum of said bed adjacent the top of said bed.

22. The process of promoting chemical reactions by contacting a fluid stream containing reactant material with a plurality of different, finely divided solid catalysts, which different finely divided catalysts have different physical, catalytic and buoyancy properties, comprising, passing a fluid stream initially containing at least one reactant material upwardly through a deep bed of the said different catalysts while they are confined in a reaction chamber at a temperature suitable for promoting said reactions, at such a velocity that the mass of finely divided solids in said bed is substantially fluidized forming a plurality of strata in said bed whereby one of said different catalysts is disposed largely in one stratum and another of said different catalysts is disposed largely in another stratum of said bed, and causing said reactant material to react chemically in said stream while passing through said strata in said bed.

23. In the process of promoting chemical reactions by passing a fluid stream initially containing reactive substance upwardly through a bed of finely divided solids confined in a reaction chamber, which bed includes two different catalysts A and B, employing fluidized solids technique, the steps for causing the said different catalysts to stratify in said bed whereby one catalyst is disposed largely in one stratum of said bed and the other catalyst is disposed largely in a different stratum, which steps comprise, fluidizing a mass of catalyst A of substantially uniformly sized particles in a reactor by passing a fluidizing stream upwardly through it at such a velocity that a dense fluidized layer is formed as a part of said bed, simultaneously fluidizing in said stream as a part of said bed a mass of particles of catalyst B which particles are substantially uniformly sized but of different catalytic activity and of such greater buoyancy than those of catalyst A that a less dense fluidized mass is formed as an upper layer of said bed.

24. In the process of promoting chemical reactions by passing a fluid stream containing reactant substance upwardly through a bed of finely divided solids comprised of two catalysts having different physical and catalytic properties and different buoyancy characteristics, while at an elevated temperature favorable for said reactant substance to react chemically, at a velocity that substantially fluidizes said solids in said bed, in which bed said solids are substantially stratified the most buoyant catalyst solids being disposed largely in the uppermost layer of said bed and the least buoyant solids being disposed largely in a lower layer thereof, the steps comprising, promoting exothermic reactions of said substance in said stream as it passes through said lower layer of said bed and simultaneously contacting said stream containing products of reaction with a cooling solid surface in said uppermost layer of said bed.

25. The continuous process of promoting chemical reactions in a reaction chamber by contacting a fluid stream containing a plurality of reactants including largely carbon monoxide and hydrogen with a plurality of finely divided solid catalysts having different buoyancy properties, comprising, passing a fluid stream initially containing said carbon monoxide and hydrogen upwardly through a deep mass of the finely divided solids while they are confined in said chamber at an elevated temperature suitable for promoting said reactions, at such a velocity that said mass of solids is substantially fluidized forming a plurality of strata in the fluidized mass, the solids in one stratum being largely of different physical and catalytic properties than those in an adjacent stratum, causing said reactants to react in substantially the bottom stratum of said mass, simultaneously introducing fluid reactant material into said stream in a higher stratum of said mass promoting additional chemical reactions in said stream and discharging the stream with reaction products overhead.

26. The process defined in claim 25 in which the stream containing reaction products contacts a cooling solid surface in the upper portion of said fluidized mass in its course therethrough.

27. The process defined in claim 25 in which a coolant fluid is introduced into said stream in a stratum of said fluidized mass below the top stratum.

28. The process of promoting chemical reactions, comprising, fluidizing a bed of finely divided solids catalysts confined in a reaction chamber which solids comprise two different catalysts having different chemical composition, different catalytic activity and different buoyancy properties, by passing a fluidizing stream upwardly therethrough at such a velocity that said finely divided solids are fluidized in said bed in stratified layers with the most buoyant catalyst in the top layer and the least buoyant catalyst in a lower layer, passing at least one reactant material upwardly into said fluidized bed in said stream while the said catalysts are at a temperature adapted to promote chemical reactions, whereby the said reactant reacts chemically in said stream while passing through said bed forming at least one valuable reaction product and removing said product with said stream, said stream passing serially upwardly through said different stratified layers in such a manner that the reaction products formed in a lower layer of said bed are immediately exposed to catalytic action of an upper layer of a different catalyst.

29. In the process of promoting chemical reaction by passing a fluid stream containing reactant material upwardly through a fluidized bed of small-size catalyst solids confined in a reaction chamber, the step of forming a plurality of stratified layers of a plurality of catalysts, one layer comprised chiefly of one catalyst and another layer comprised of a different catalyst, which layers are all a part of said fluidized bed, by fluidizing as at least a large portion of said bed two different finely divided catalysts whose particles have appreciably different physical and catalytic properties and appreciably different buoyancy characteristics.

30. In the process of promoting chemical reactions in a fluidized mass of small-size solid particles which mass comprises two different catalysts of different particle size and density by passing a fluid stream initially containing at least one reactant material upwardly into and through said mass while said mass is confined in a reaction chamber while its particles are at a temperature favorable for said chemical reactions to occur and removing the reaction product from above said mass, the steps comprising, fluidizing a bed of different kinds of small-size solid particles which bed comprises particles having different physical and catalytic characteristics, by passing a fluid stream initially containing reactant material upwardly therethrough at a fluidizing velocity, so selecting the said different kinds of particles as to their densities and size that they form different stratified layers in the fluidized bed, particles disposed in one of said layers having different catalytic activity on the reaction of said material than those disposed in an adjacent layer, whereby the stream initially containing said reactant material passes serially through the thus stratified layers, and at least partly cooling the stream containing the reaction products before it leaves said chamber.

31. The continuous process of promoting chemical reactions by contacting reactant materials with finely divided solids, comprising, fluidizing while confined in a reaction chamber at reaction temperature a deep bed of finely divided solids which solids comprise particles having different physical characteristics, catalytic activity and buoyancy, by passing a fluid stream initially containing reactant material upwardly through said mass as a velocity such that said solids are fluidized in a plurality of different layers substantially as a common dense fluidized bed, the least buoyant solids being largely in the bottom layer and the more buoyant solids being largely in an upper layer, and reacting said material in said stream while said stream passes through the fluidized stratified bed in contact with said solids, meanwhile introducing a cooling fluid into said stream in said bed at a level above the bottom layer of said bed.

WILLIAM W. ODELL.

REFERENCES CITED

The following references are of record in the file of this patent:

UNITED STATES PATENTS

| Number | Name | Date |
|---|---|---|
| 1,687,118 | Winkler | Oct. 9, 1928 |
| 1,984,380 | Odell | Dec. 18, 1934 |
| 2,206,021 | Blunck | July 2, 1940 |
| 2,213,345 | Marschner | Sept. 3, 1940 |
| 2,268,187 | Churchill | Dec. 20, 1941 |
| 2,319,710 | Stratford et al. | May 18, 1943 |
| 2,325,136 | Kassel | July 27, 1943 |
| 2,325,611 | Keranen | Aug. 3, 1943 |
| 2,339,932 | Kuhl | Jan. 25, 1944 |
| 2,341,193 | Scheineman | Feb. 8, 1944 |
| 2,356,680 | Marancik et al. | Aug. 22, 1944 |
| 2,356,697 | Rial | Aug. 22, 1944 |
| 2,360,622 | Roetheli | Oct. 17, 1944 |
| 2,361,978 | Swearingen | Nov. 7, 1944 |
| 2,362,270 | Hemminger | Nov. 7, 1944 |
| 2,363,874 | Krebs | Nov. 28, 1944 |
| 2,374,660 | Belchetz et al. | May 1, 1945 |
| 2,379,711 | Hemminger | July 3, 1945 |
| 2,387,309 | Sweeney | Oct. 23, 1945 |
| 2,393,636 | Johnson | Jan. 29, 1946 |
| 2,394,680 | Gerhold et al. | Feb. 12, 1946 |
| 2,396,109 | Martin | Mar. 5, 1946 |
| 2,399,050 | Martin | Apr. 23, 1946 |